United States Patent [19]
Setani

[11] Patent Number: 5,173,599
[45] Date of Patent: Dec. 22, 1992

[54] COLOR IMAGE READING APPARATUS WITH BLAZED DIFFRACTION GRATING

[75] Inventor: Michitaka Setani, Kawasaki, Japan

[73] Assignee: Canon Kabushiki Kaisha, Tokyo, Japan

[21] Appl. No.: 865,647

[22] Filed: Apr. 10, 1992

Related U.S. Application Data

[63] Continuation of Ser. No. 572,469, Aug. 27, 1990, abandoned.

[30] Foreign Application Priority Data

Aug. 29, 1989 [JP] Japan ................. 1-222535

[51] Int. Cl.$^5$ .................... H01J 40/14; G02B 5/18
[52] U.S. Cl. .................... 250/208.1; 250/226; 250/237 R; 359/571
[58] Field of Search ........... 350/162.22; 250/208.1, 250/226, 237 R, 237 G, 234; 358/75, 482, 483, 494; 359/571

[56] References Cited

U.S. PATENT DOCUMENTS

| | | | |
|---|---|---|---|
| 3,658,423 | 4/1972 | Elliott | 350/162.22 |
| 4,011,009 | 3/1977 | Lama et al. | 350/162.22 |
| 4,105,290 | 8/1978 | Quinn | 350/162.22 |
| 4,264,921 | 4/1981 | Pennington . | |
| 4,277,138 | 7/1981 | Dammann | 350/162 |
| 4,870,268 | 9/1989 | Vincent et al. | 250/226 |
| 4,886,341 | 12/1989 | Oishi et al. | 350/162.22 |
| 4,926,041 | 5/1990 | Boyd | 250/226 |
| 4,959,541 | 9/1990 | Boyd | 250/208.1 |
| 5,019,703 | 5/1991 | Boyd et al. | 250/208.1 |
| 5,113,067 | 5/1992 | Nakai et al. | 250/208.1 |

FOREIGN PATENT DOCUMENTS 2645070 10/1976 Fed. Rep. of Germany .
62-34106 10/1987 Japan .

*Primary Examiner*—David C. Nelms
*Assistant Examiner*—Michael Messinger
*Attorney, Agent, or Firm*—Fitzpatrick, Cella, Harper & Scinto

[57] ABSTRACT

A color image reading apparatus comprises a plurality of line sensors, an optical system for forming an image of a subject, a blazed diffraction grating inserted in light path between the optical system and the sensors, and a slit inserted in light path between the subject and the optical system. The blazed diffraction grating separates light beams from the subject into plurality color lights and directs them to their corresponding sensor arrays. The slit has an aperture, the size of which in the array direction of the sensors is longer than that in the direction perpendicular to the array direction of the sensors. By construction of the apparatus according to the present invention, noise light can be prevented so as to read high accuracy digital color image.

100 Claims, 7 Drawing Sheets

SUB SCANNING SECTION

F I G. 4
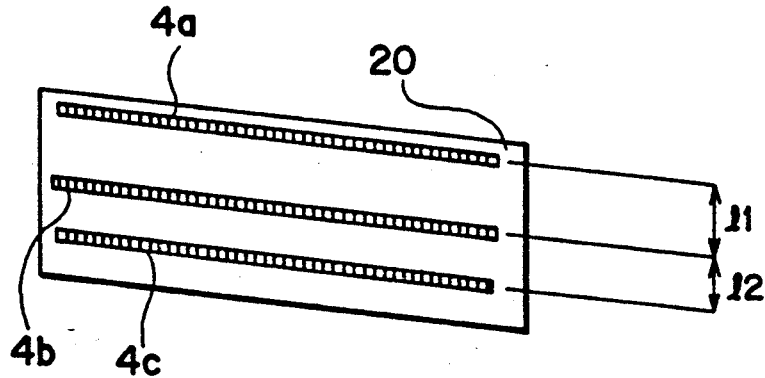

SUB SCANNING SECTION

SUB SCANNING SECTION

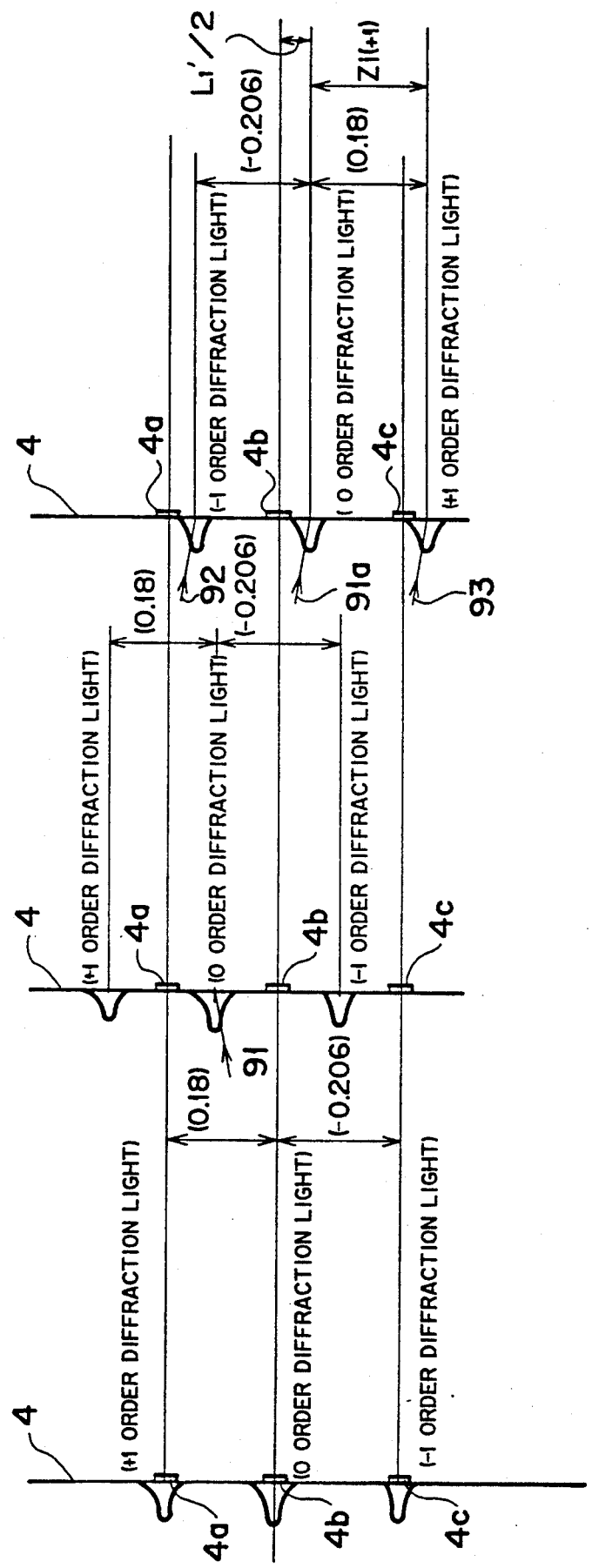
FIG. 9 SUB SCANNING SECTION

COLOR IMAGE READING APPARATUS WITH BLAZED DIFFRACTION GRATING

This application is a continuation of application Ser. No. 07/572,469 filed Aug. 27, 1990, now abandoned.

BACKGROUND AND SUMMARY OF THE INVENTION

The present invention relates generally to a color image reading apparatus and, more particularly is directed to a color image reading apparatus for use in color scanners, color facsimiles, etc., that offer a high accuracy reading of the color image information while shutting out extraneous light therefrom When the surface of an original is scanned, by application of a color separation element consisting a blazed diffraction grating and a detection means including three line sensors.

Hitherto several varieties of readers have been introduced that digitally read the color image information of an original by utilizing the output signal of line sensors such as CCDs on which the color image information is formed through an optical system.

FIG. 1 shows a schematic diagram of a conventional color image reader.

FIG. 1 shows that a light beam from the color image on an original surface 1 is condensed by an image-formation lens 15. When the image is to be formed on the surface of the line sensors, explained later, a 3P-prism 16 is inserted in the said light beam path. After color separation of the beam into, for instance, the three colors red R, green G and blue B, the light is introduced to the surface of the line sensors 17, 18 and 19 which are each comprised of CCDs or the like. Then, the color images formed on the surface of the line sensors 17, 18 and 19 are read separately for each color by means of line scanning.

FIG. 2 shows the essential part of a color image reader disclosed in Japanese Patent Application Laid-Open No. 62-234106.

FIG. 2 shows that the light beam from the color image on the original surface 1 is condensed by an image-formation lens 28. When the image is to be formed on the surface of the line sensors, explained later, the light beam is separated into three beams corresponding to the three colors by means of beam splitters 29 and 30 for color separation, that are equipped with a film that selectively allows transmittance of two colors. Then, the three color beams that make up the color image are directed to three line sensors 31a, 31b and 31c installed on the same substrate, the so-called monolithic 3-line sensor 31, and the image is formed on the surface of each of the line sensors.

Then the color images are line scanned separately for each color.

The U.S. Pat. No. 4,277,138 (corresponding to DE No. 2645075) introduces a color image detector. In this case, a blazed diffraction grating is used as the optical element for color separation. The incident color image information separated into colors are thereby detected.

The color image reader shown in FIG. 1 becomes expensive and generally complicated since it requires the application of three independent line sensors, and high accuracy is required. Further, the difficulties involved in manufacturing the 3P-prism must be considered. Another problem is that adjustment of the system is bothersome since it is necessary to make three independent adjustments of the condensed beams sent to each line sensor.

In the case of the color image reader shown in FIG. 2, if the plate thickness of the beam splitters 29 and 30 is indicated as t, the distance, between each line of the line sensor becomes $2\cdot\sqrt{2}f$. Line sensors produced now come preferably with a distance of generally 0.1–0.2 mm between each line. This means that the plate thickness t of the beam splitters (29) and (30) must be about 35–70 μm.

In general, it is extremely difficult to manufacture beam splitters that maintain an optical plane surface character when the plate is as thin as in this example. Applying beam splitters as thin as these, poses a problem as the optical performance of the color image formed on the surface of the line sensors deteriorates.

U.S. Pat. No. 4,277,138 (corresponding to DE No. 2645075), which is a color image reader where a dichroic mirror is substituted by a blazed diffraction grating, poses a problem since it only treats one beam from each point of the surface of the subject. If, for instance, a reflective original is being read, extraneous light not belonging to the optical axis of the beam may pass through the blazed diffraction grating and the incident light reaching the line sensors will contain noise light of a wrong color composition.

The present invention is intended to provide a color image reader that can digitally read with high accuracy a color image by utilizing for instance the three color beams R, G and B. When reading a color image by color separation utilizing one-dimensional blazed diffraction grating, a slit, that satisfies predetermined conditions, positioned between an original surface and a projection optical system, effectively prevents noise light, in the form of extraneous light not belonging to the optical axis of the beam and created by the diffraction, from reaching the line sensors on which the image is formed.

In the color image reader according to the present invention, the color image on the surface of an original is illuminated by means of an illumination device. Said color image is projected by the projection optical system to the surface of the detection device where three line sensors are arranged parallel on an identical substrate. When said color image is read by said detection device, the one-dimensional blazed diffraction grating, that which separates the light beam from said projection optical system into three beams of separate colors in the direction normal to the arrangement direction of the picture elements of the line sensor's and also leads the beams to three respective line sensors, is positioned behind said projection optical system. Also, a slit having an aperture which extends longer in the arrangement direction of the picture elements of the line sensors is positioned in the optical path from the original surface to said projection optical system. This arrangement prevents noise light in the form of extraneous light caused by diffraction.

To effectively prevent noise light, the prescribed elements should meet the conditions that $$L1'/2 < L2$$

where L1' is the length of penumbra on the surface of said detecting means in the shorter direction defined by said projection optical system and the slit, and L2 is the shortest interval between the sensors in the direction normal to the array direction of said three line sensors.

In addition, in the present invention said slit has a transparent aperture formed by the application of etchings on the base surface that absorbs infrared light, and the slit is installed in the way that allows it to move in the array direction of the line sensors.

BRIEF DESCRIPTION OF THE DRAWINGS

FIG. 4 is an explanatory diagram of the three line sensors of FIG. 3. FIG. 7, FIG. 9, and FIG. 11 are conceptual diagram showing the light beams incident on the surface of each of the three line sensors.

DESCRIPTION OF THE PREFERRED EMBODIMENTS

Figure 1:
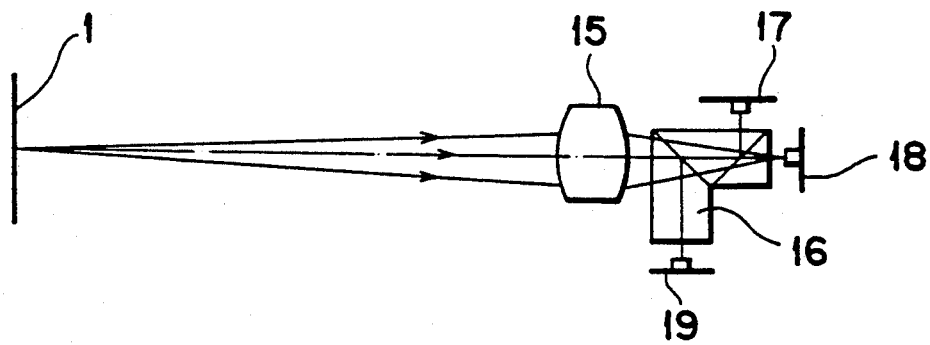
FIG. 1 and FIG. 2 show schematic diagrams of conventional color image readers.
Figure 2:
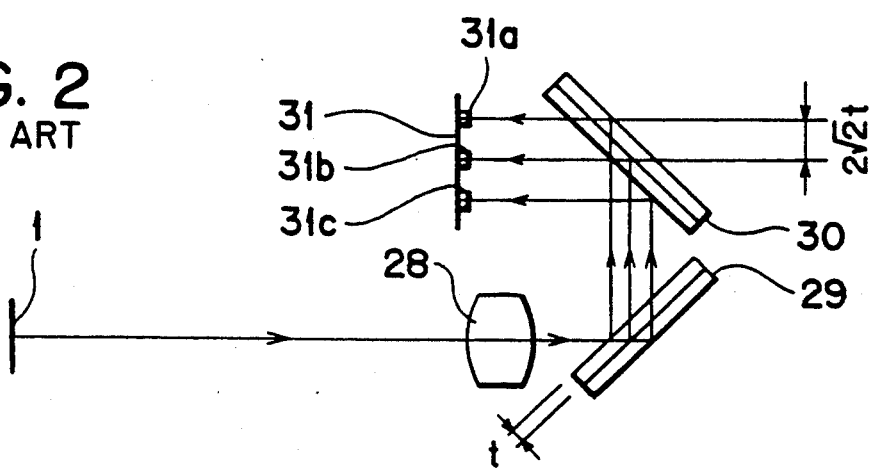
Figure 3:
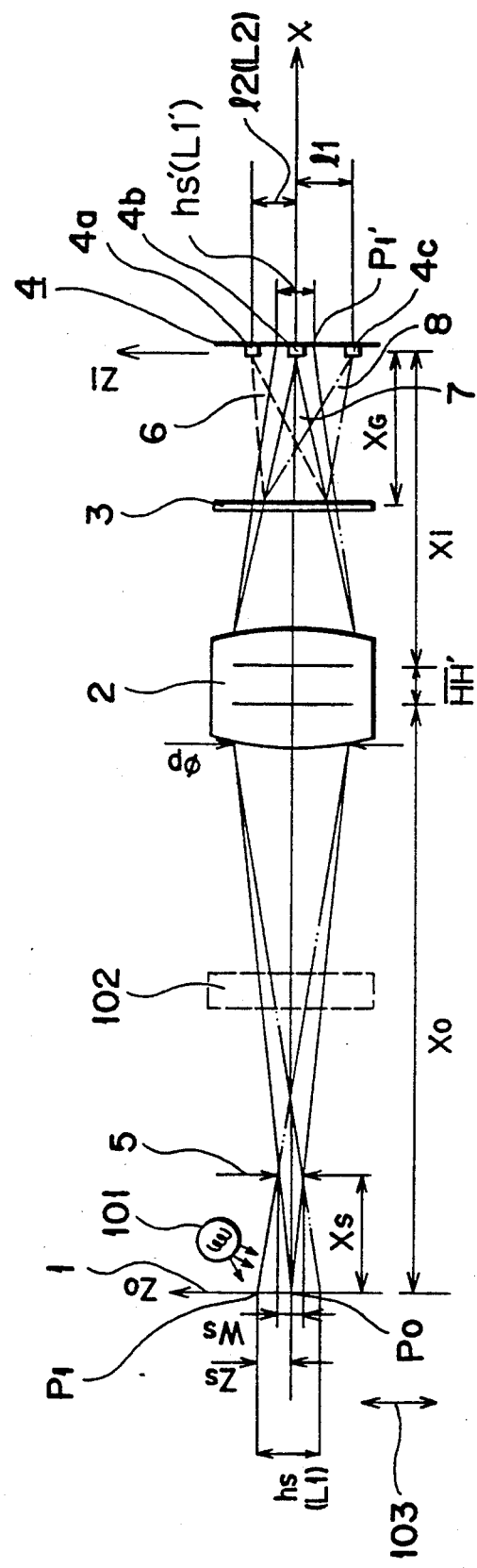
FIG. 3 is a schematic diagram of the principal optical elements in the first embodiment of the color image reader according to the present invention.

FIG. 3 is a schematic diagram of the principal elements in the first embodiment of the color image reader according to the present invention. FIG. 1 illustrates the aspect in the sub-scanning section.

The reference numeral 1 in FIG. 3 is an original surface to be scanned where the color image is imprinted. Numeral 101 denotes an illumination source comprising, for example, a halogen lamp, fluorescent light, etc. Numeral 102 represents a scanning device consisting of mirrors that line scan the original surface 1 in the sub-scanning direction 103. Numeral 2 is a projection optical system. Numeral 3 is a one-dimensional blazed diffraction grating serving as a color separation element, inserted into the optical path between the projection optical system 2 and the detection device 4, that separates the light beam from the projection optical system 2 into predetermined color beams, for instance three basic color beams of red 6, green 7 and blue 8 in the direction of sub-scanning as shown in FIG. 3.

Numeral 4 is the detection device, for example, comprising so-called monolithic three line sensors including three CCD line sensors 4a, 4d, and 4c, which are disposed with definite intervals, parallel to each other on the identical substrate 20 in the direction perpendicular to the sensor array direction. Each of the line sensors 4a, 4b, and 4c extend in the direction perpendicular to X and Zi directions in the diagram. Each line sensor surface is equipped with a color filter (not shown) based on the respective color beam. The intervals 11 and 12 between each line sensor corresponds with the color separation direction of the color separation element 3 and is set according to the corresponding individual value. Numeral 5 represents a slit. The slit 5 has an aperture such that the size in the direction perpendicular to paper surface (main scanning direction) along which the picture elements of line sensors 4a, 4b, and 4c are arranged is larger than that in the sub-scanning direction. The slit 5 is positioned between the original surface 1 and the projection optical system 2, according to the required conditions explained later. Moreover, the slit 5 is positioned s that it is capable of traveling in the sub-scanning direction 103. By moving the slit 5 in the sub-scanning direction, the axes of the slit 5 and the projection optical system 2 are aligned.

In the present embodiment, the scattered reflected light from the color image on the original surface 1 is scanned by the scanning device 102. The light beam from said scanning device 102 is condensed by the projection optical system 2 and reaches the one-dimensional blazed diffraction grating 3 through which the beam is separated into three color beams. Then, the separated color images on the original surface 1 are formed on the surface of each of the three line sensors 4a, 4b, and 4c. Then the color image On the original surface 1 is Sequentially digitally read by the detection device 4. In other words, the color image information on the original surface 1 is read by the scanning device 102 by relative movement in the sub-scanning direction of the original surface 1 and the image reader (projection optical system 2, diffraction grating 3, and detection device 4).

Figure 5:
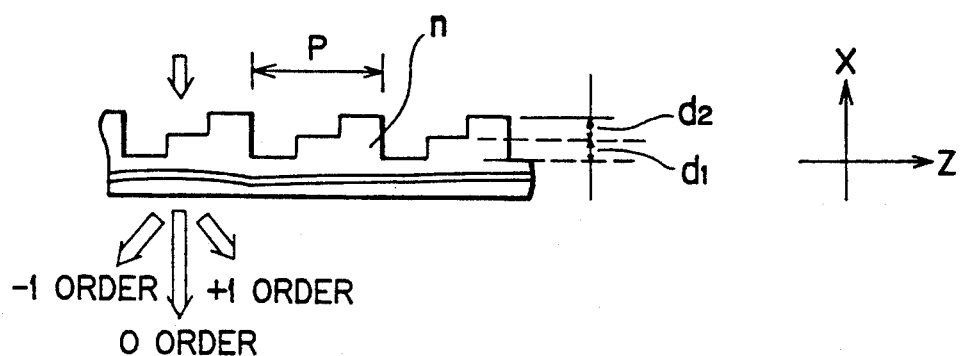
FIG. 5 is an explanatory diagram of the one-dimensional blazed diffraction grating in FIG. 3.
Figure 6:
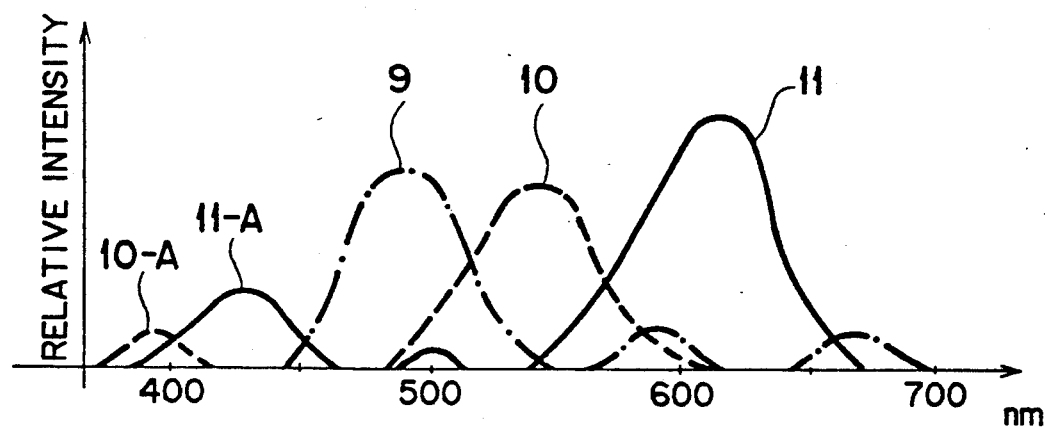
FIG. 6 is an explanatory diagram showing the spectral characteristics of the diffracted light produced by the one-dimensional blazed diffraction grating in FIG. 5.

Following is an explanation with reference to FIG. 5 of the one dimensional blazed diffraction grating 3 employed for color separation in the present embodiment. As the figure shows, in the direction of color separation the grating is of a step-like cyclically repeated construction, and the dimensions of the grating, for example, are such that the cyclic pitch P is 60 $\mu$m, the grating thicknesses d1, d2 are 3100 nm, respectively, and the refractive index n of the material is about 1.5. In this case, incident light is transmitted and diffracted to be mainly separated into three directions, as shown in FIG. 5. The intensity of the color separation of the diffracted light in the respective order is shown in FIG. 6. However, the intensity curve in FIG. 6 takes into consideration such characteristics appearing when a filter for removing harmful infrared light is employed as well as the halogen illumination source. In the present embodiment, the blue light component (B component) is set to the 0 order light to thereby compensate the blue component which is liable to run short in case of light source utilizing the blackbody radiation.

The +1 order diffracted light is the green component (G component) 10, and −1 order diffracted light is the red component (R component) 11. Wherein, the ±1 order diffracted light components due to diffraction are separated into the Z direction at the surface of the detection device 4 (the surface of line sensors), according to the equation below. As shown in FIG. 3, when XG is assigned to the distance from the one dimensional blazed diffraction grating 3 to the detection device 4, Z coordinate (Zi) of diffraction light can be expressed by the following equation.

$$Zi = XG \cdot \tan\left(\sin^{-1}\left(\frac{\pm\lambda}{P}\right)\right)$$

where $\lambda$: wavelength code: positive . . . +1 order, negative . . . −1 order.

Therefore, except 0 order light component 9, ±1 order diffraction lights 10 and 11 are dependent on their wavelengths and their reach points on line sensor surface 4 differ from each other.

Next, specific explanation is made with numerical examples. From the above-mentioned grating structure, the following conditions can be established for the center wavelengths of each diffraction light components as shown in FIG. 6.

0 order light component wavelength $\lambda_0=480$ nm
+1 order light component wavelength $\lambda_{+1}=540$ nm
−1 order light component wavelength $\lambda_{-1}=617$ nm In other words, when XG=20 mm is used as the distance XG from the one-dimensional blazed diffraction grating 3 to line sensor surface 4, the positions of three line sensors become as follows.

$Z_i(+1)=0.18$ mm is the line corresponding to +1 order diffraction light (G component) in Z direction in the figure.

$Z_i(0)=0$ mm as the line corresponding to 0 order light (B component).

$Z_i(-1)=-0.206$ mm is the line corresponding to −1 order diffraction light (R component).

Figure 7:
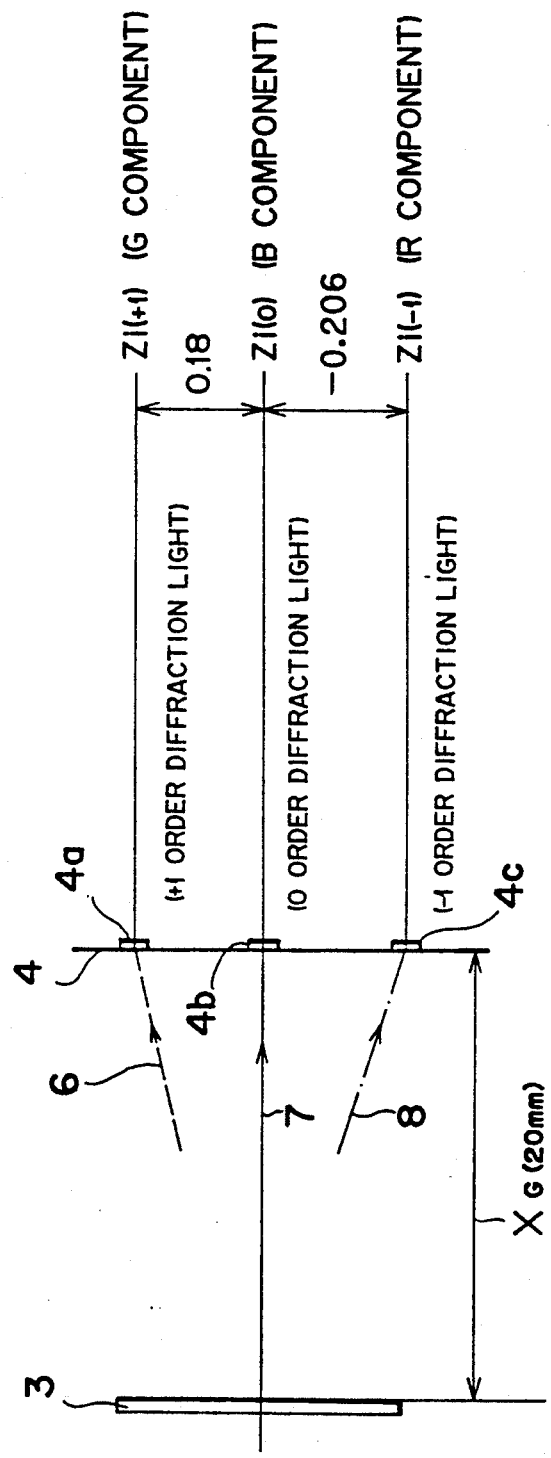

FIG. 7 shows the coordinate relations among 0 order diffraction light 7 and ±1 order diffraction lights 6 and 8. FIG. 7 is the diagram showing the aspect in sub-scanning Cross-section and main parts only.

When reading the color image on the original surface 1 in this application example, it is desirable to allow incidence of the beams only from one point $P_0$ on the axis on the original surface 1 into line sensors 4a, 4b, and 4c. Generally, however, 0 order light or high order light from points deviating from the optical axis become noise light and this noise light enters into line sensors 4a, 4b, and 4c.

Therefore, under the subject application example, among the beams from points deviating from the optical axis that are condensed by the projection optical system 2, the light which has transmitted through one-dimensional blazed diffraction grating 3 with 0 order (0 order diffraction light) is prevented from entering into line sensors 4a and 4c for ±1 order diffraction light as noise lights by employing the slit 5.

In other words, as shown in FIG. 3, slit 5 possessing the required aperture is provided at the position separated by, for example, distance $X_s$ from the original surface 1. The light, for example, from the point $P_1$ deviating from the optical axis is prevented from entering the line sensors 4a and 4c and becoming noise light by such a manner that image h' (length L1') of the penumbra edge $h_s$ (length L1) on the original surface 1 determined by the slit 5 is formed on the surface 4 of the detection device with a predetermined size or less by the projection optical system 2.

The size of penumbra edge is determined by the size of the pupil of the projection optical system and that of slit aperture. As shown in FIG. 3, the size of penumbra edge $h_s$ (L1) is determined by size $\phi_P$ of the pupil of projection optical system in sub-scanning direction and size $W_s$ of the aperture of slit 5 in sub-scanning direction.

Under the subject application example, according to optically conjugate relation which takes diffraction phenomenon into account, penumbra edge $h_s$ on the original surface is set to cause the image forming position on the line sensor surface to come at least on center line sensor 4b. Or this image forming position is also designed to deviate in the diffraction direction on detection surface 4. By this method, noise included into 0 order light component of ±1 order diffraction light is virtually removed.

By making the following code assignment under the subject application example, the elements are set to at least satisfy the conditions established by the equation below.

$$L1'/2 < L2 \quad (1)$$

where
L1: length of penumbra edge $h_s$ in sub-scanning direction determined by the pupil diameter of projection optical system 2 and the aperture of the slit 5 in sub-scanning direction 103
L1': Length of the image of penumbra edge $h_s$ possessing length L1, projected on the surface of the detection device 4 by the projection optical system 2
L2: Distance shorter of two distances 11 and 12 in sub-scanning direction among line sensors 4a, 4b, and 4c shown in FIG. 4

In actual, by considering line sensor width (sub-scanning direction width), beam width (sub-scanning direction width) of the diffraction light, and other factors, the above Equation (1) can be expressed as follows.

$$L1'/2 > 0.95 \times L2 \quad (1a)$$

When the condition in (1a) are satisfied, noise light can be effectively removed.

Next, explanations are made by using the symbols shown in FIG. 3. First, distance $X_S$ can be expressed as follows.

$$X_s = \frac{Z_s \times X_0}{\phi_p + Z_s}$$

where,
m: image forming magnification of projection optical system 2
$X_0$: distance from the original surface 1 to the projection optical system 2
$Z_s$: coordinates of penumbra edge (original surface) (distances which causes the 0 order diffraction light to be entered into line sensors 4a and 4c for receiving ±1 order diffraction lights)
$\phi_P$: entrance pupil diameter of the projection optical system 2

Next, by defining as follows:
$X_s$: position of slit 5 (distance from the original surface 1 to the slit 5)
$W_s$: width of the slit 5 in sub-scanning direction
Slit width $W_s$ can be expressed as follows.

$$W_s = \frac{\phi_p}{X_0} + X_s$$

Indicated hereinafter are actual numerical value examples.

Now, When $m=-1/6.35$, $X_0=735$ mm, and $\phi_P=25$ mm are assumed, this is equivalent to the case of performing size-reduced reading with the projection optical system of focal distance of f=100 mm and brightness of FNO=4.0 by using a line sensor with resolving power of 400 dpi and picture element size of 10 μm.

In this case, the values of $X_s=26.46$ mm and $W_s=0.90$ mm are obtained. These values represent the shape sufficiently realizable even if spaces for illumination and others are taken into account.

Figure 8:
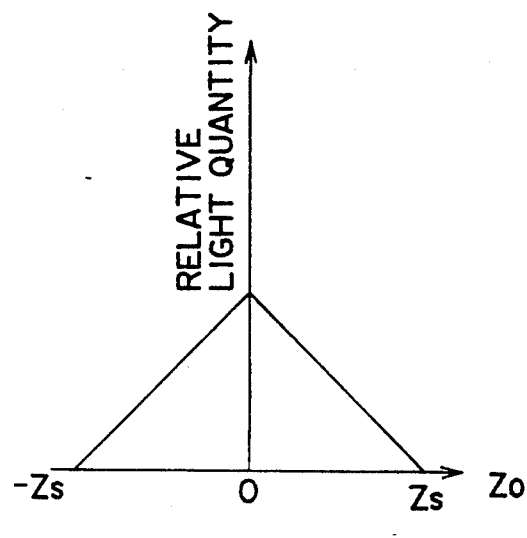
FIG. 8 is an explanatory diagram conceptually showing control of light quantity reaching the line sensors via the slit in FIG. 3.

FIG. 8 illustrates the outline of light quantity distribution to the line sensors mentioned in the above example case. As shown in this figure, along with increase of distance from the optical axis, the light quantity simply decreases according to the effective beam diameter determined by the slit width $W_s$ and the entrance pupil diameter of the projection optical system.

In the structure of the slit 5 shown in FIG. 3, the slit 5 merely has aperture width, for example, indicated is a type with an opening formed on a metal plate. Pertaining to the application example discussed herein, image reading may be performed in broad width in main scanning direction which is the direction perpendicular to the cross-sectional area shown in FIG. 3. In case of such image reading, use of pressed sheet metal or other materials may involve difficulty in attaining the required accuracy in uniformly forming the width of $W_s = 0.9$ mm of slit 5 appearing in FIG. 3. For this reason, as is the case with the subject application example, it is effective to employ the slit structure of forming nontransparent sections on glass or other transparent material by means of etching or other methods.

Further, by providing wavelength selection transparency on the transparent sections of the slit 5, incidence of harmful infrared rays or the like, for instance, from illuminating means, can be effectively eliminated.

For the subject application example, the slit 5 may be movably set in sub-scanning direction so that the aperture of the slit can be correctly positioned with high accuracy with respect to the optical axis of the projection optical system 2.

Next, in the present embodiment, light (mainly ±1 order diffraction light) diffracted by the one dimensional blazed diffraction grating 3, among the light beam from the point $P_2$ deviating from the optical axis being condensed by the projection optical system 2, is prevented from entering into the line sensor and becoming noise light by such a manner.

As shown in FIG. 3, the beam from the point $P_1$ deviating from the optical axis on the original surface 1 is condensed by the projection optical system 2 and is incident on the one-dimensional blazed diffraction grating. In this case, the incidence position of 0 order diffraction light 91 of beam from point deviating from the optical axis, from the one-dimensional blazed diffraction grating 3 to the surface of the detection means 4, can be set as indicated in FIG. 9. That is, by setting the position of the slit 5 and the slit width $W_s$ as previously explained, the said beam is prevented from entering into either of line sensors 4a or 4c. Instead, said beam is caused to be incident on a lower position on the optical axis. (FIG. 9 shows various conceptional cases involving plural number of detection means 4 along the optical axis.) More specifically, 0 order diffraction light 91 is positioned between the optical axis and the line sensor 4a. In this case, ±1 order diffraction light based on the light beam from the point $P_1$ deviating from the optical axis does not enter into line sensors 4a and 4c.

On the other hand, there is a possibility of such a case that ±1 order diffraction lights (92, 93) accompanying 0 order diffraction light (91a) of light beam from point $P_{1a}$ which deviates from the optical axis and is symmetrical to the point $P_1$, with respect to the optical axis, may be entered into the line sensors (4a, 4c), as shown in FIG. 9.

Under the subject application example adopted, is the mounting of color filters on the sensors, namely, a green filter on line sensor 4a, a blue filter on line sensor 4b, and a red filter on line sensor 4c. As a result, the overall spectrum sensitivity characteristics on receiving light at the line sensors are caused to become the spectrum characteristics (12, 13, 14) shown in FIG. 10, thereby succeeding in preventing incidence of diffraction light of different colors.

When color filters are not attached on the line sensors, the following method is employed. To prevent incidence into line sensors 4a and 4c of ±1 order diffraction light based on the point $P_{1a}$ deviating from the optical axis, as noise light, entry of the +1 order diffraction light (93) into line sensor 4c must be prevented. That is, as shown in FIG. 9, what adds the coordinate point $Zi(+1)$ of the +1 order diffraction light (93) in Z axis direction to the distance $L1'/2$ from the optical axis of the projection optical system of the 0 order diffraction light of light beam from a point deviating from the optical axis is caused not to enter into the line sensor 4c (the coordinate point $Zi(-1)$ in Z axis direction) which is positioned so as to receive the −1 order diffraction light based on the light beam from the on-axis point $P_0$. Therefore, this prevention can be achieved by establishing the following conditions.

$$Zi(-1) > Li'/2 + Zi(+1)$$

$$Zi(-1) - Zi(+1) > L1'/2$$

In this manner, entry of the +1 order diffraction light 93 into the line sensor 4c can be prevented In other words, half of length $L1'$ of penumbra edge (length L1) on the surface of the detection means 4 may be made smaller than the difference of Z-axis direction coordinate of +1 order diffraction light on the surface of the detection means 4.

Next, the subject application example uses slit 5 for the prevention of noise light as follows. Among the beams from points deviating from the optical axis being condensed by the projection optical system, side-band components as shown in FIG. 6, which accompany ±1 order diffraction light diffracted by the one-dimensional blazed diffraction grating, are prevented from entering into the line sensors and becoming noise light in the following manner.

Figure 10:
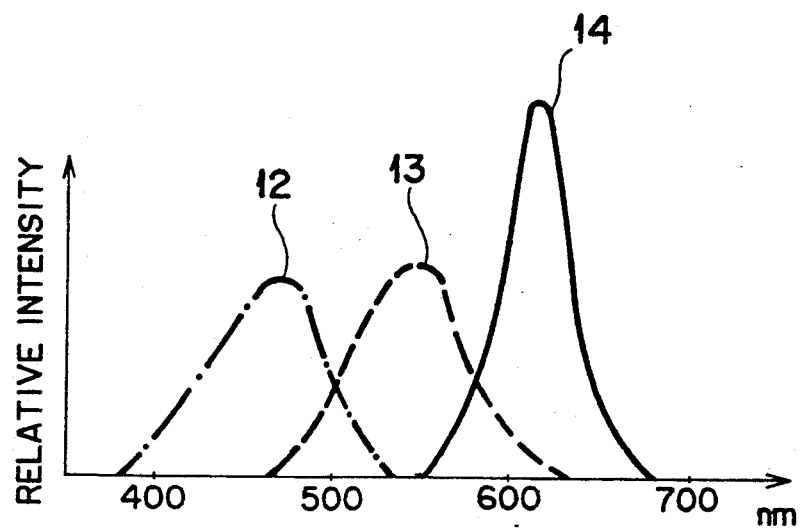
FIG. 10 is an explanatory diagram showing spectral sensitivity of the three line sensors in FIG. 3.

With regard to light beams from the out-of-axis point P, deviating from the on-axis object point $P_0$ in the subject surface by the distance $Z_s$ in $Z_0$ direction as shown in FIG. 3, for example, when the image of side-band component 10-A (in FIG. 6) of the +1 order diffraction light is just formed on the center line sensor 4b (B component), most of the side-band component is eliminated by the overall spectrum sensitivity of the line sensor 4b for B component by curve 12 shown in FIG. 10. As a result, the side-band components can be ignored as noise light to B components. On the other hand, when side-band component 11-A of −1 order diffraction light exists as an out-of-axis point conjugate with others, such component cannot be sufficiently blocked by color filter or the like because a portion of overall spectrum sensitivity is overlapped. Consequently, the side-band components intermingle to B component that is 0 order light component as noise light. In order to prevent this phenomenon, in the present embodiment, light beams from optically conjugate object points deviating from the optical axis on the original surface are essentially eliminated in the following manner so that the image of the side-band component 11-A is not formed on the central line sensor 4b as the −1 order diffraction light.

Figure 11:
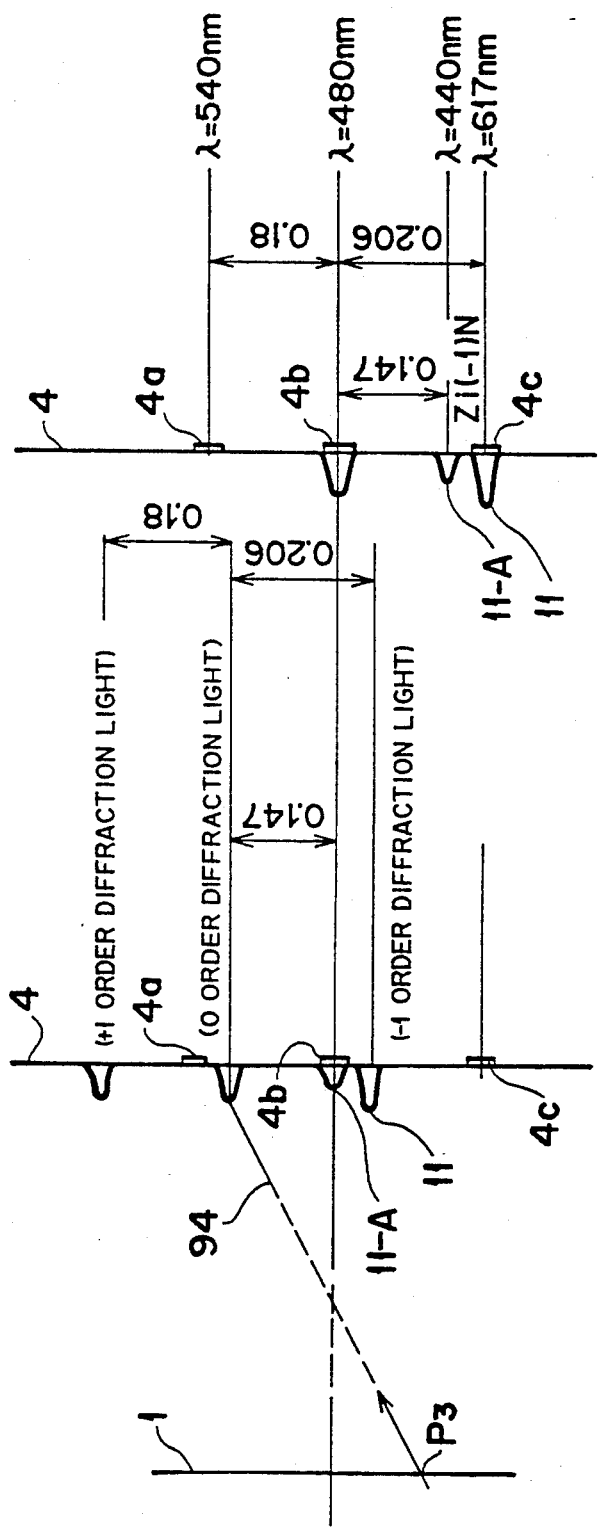

Noise light to be removed, namely, side-band component 11-A shown in FIG. 6, is −1 order light component with center wavelength of $\lambda_{-1,N} = 440$ nm. The coordinate $Zi_{(-1)N}$ of the incidence position on the surface of the detection means 4 is calculated to be $Zi_{(-1)N} = -0.147$ mm. In other words, as shown in FIG. 11, when there is such a condition that the image of the 0 order light component 94 from a point $P_3$ deviating from the optical axis is formed at the position $Zi_{(0)} = +0.147$ mm, the side-band light 11-A with the center wavelength of $\lambda_{-1.N} = 440$ nm within the $-1$ order diffraction light intermingles with the line sensor 4b as noise light. Under the subject application example, the coordinate $Zi_{(-1)N} (=0.147)$ of the side-band component 11-A that becomes noise light is generally of small values as shown in FIG. 11, compared with coordinate $Zi_{(+1)} (=0.18)$ of the $+1$ order diffraction light based on the on-axis point $P_0$. Additionally, by considering various other factors, the condition for removal of noise light due to the side-band components is expressed as follows when the above-mentioned Equation (1) is employed.

$$L1'/2 < 0.8 \times L2$$

By this condition setting, incidence of the side-band component 11-A of the $-1$ order diffraction light into the line sensor 4b to become noise light can be effectively prevented.

Thus, in the present embodiment, noise light is removed by such manner that the value $L1'/2$ is set to be smaller than the distance $Zi$ ($L1'/2 < Zi$) from the optical axis of the projection optical system when the side-band wave (side band) component on the short wavelength side among the $\pm 1$ order diffraction light components reaches the surface of the line sensor.

Now, in the present embodiment, there is illustrated such a case that the upper limit of the value of the slit width $W_s$, when positioning the slit 5 at a predetermined position, is set as mentioned above by the use of the length $L1'$ of the penumbra edge, to thereby remove noise light. However, the lower limit of the value of the slit width is not concretely specified. This is because all that is needed to do is to reduce length $L1'$ of penumbra edge if the slit width $W_s$ is narrowed. Therefore, the lower limit value can only be set as follows.

$$0 < L1'/2$$

According to the present invention, when color image information is read by line scanning by the use of monolithic three line sensor, noise light is removed by using both the one-dimensional blazed diffraction grating as a color resolution element and the slit to satisfy the above mentioned condition. By using the grating and the slit to satisfy the condition mentioned above, 0 order diffraction light among light beams from a point deviating from the optical axis can be prevented from entering into the three line sensors for detecting $\pm 1$ order diffraction lights, and $\pm 1$ order diffraction lights based on light beams from a point deviating from the optical axis can be prevented from entering into the line sensors from detecting $\pm 1$ order diffraction lights based on light beams from a on-axis point. Further, side-band components among $\pm 1$ order diffraction light components based on light beam from point deviating from the optical axis can be prevented from intermingling with the central line sensor corresponding to 0 order light components as noise light and noise light due to the side-band components is substantially eliminated by each element being set so that its optically conjugate object point is positioned at penumbra edge or its outside. Thus, the present invention is able to provide a color image reading apparatus capable of reading high accuracy digital color image.

What is claimed is:

1. A color image reading apparatus, comprising:
   a plurality of line sensors provided with plural one-dimensional sensor arrays;
   an image forming optical system for forming an image of a subject on said plurality of line sensors;
   a blazed diffraction grating disposed in a light path between said image forming optical system and said plurality of line sensors, for separating light from the subject into a plurality of color lights and for providing the separated light to corresponding ones of said plural one-dimensional sensor arrays; and
   a slit provided in the light path between the subject and said image-forming optical system; and having an aperture the size of which in an array direction of said plural one-dimensional sensor arrays is longer than that in a direction perpendicular to the array direction of said plural one-dimensional sensor arrays, wherein from among the light from points of the subject deviating from an optical axis having been converged by said image forming optical system, said slit is arranged to prevent a 0-order component of the light through said blazed diffraction grating from being incident on said plurality of line sensors receives $-1$-order and $\pm 1$-order diffracted light from said blazed diffraction grating.

2. An apparatus according to claim 1, wherein said plural one dimensional line sensors comprise monolithic three-line sensors including one-dimensional sensor arrays arranged in three lines with a finite distance in the direction perpendicular to the array direction of said plural one-dimensional sensor arrays arranged on a common substrate.

3. An apparatus according to claim 2, wherein the subject is scanned in a sub-scanning direction orthogonal to the array direction of said plural one-dimensional sensor arrays.

4. An apparatus according to claim 3, wherein sensor surfaces of said monolithic three-line sensors are arranged in parallel with the sub-scanning direction.

5. An apparatus according to claim 1, wherein said image-forming optical system comprises a size-reducing optical system.

6. An apparatus according to claim 1, wherein said blazed diffraction grating comprises a one-dimensional blazed diffraction grating.

7. A color image reading apparatus, comprising:
   a plurality of line sensors provided with plural one-dimensional sensor arrays;
   an image forming optical system for forming an image of a subject on said plurality of line sensors;
   a blazed diffraction grating disposed in a light path between said image forming optical system and said plurality of line sensors, for separating light from the subject into a plurality of color lights and for providing the separated lights to corresponding ones of said sensor arrays; and
   a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein said slit is movable in the direction perpendicular to the array direction of said plural one-dimensional sensor arrays.

8. An apparatus according to claim 7, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

9. An apparatus according to claim 8, wherein the subject is scanned in a sub-scanning direction orthogonal to the array direction of said plural one-dimensional sensor arrays.

10. An apparatus according to claim 9, wherein sensor surfaces of said monolithic three-line sensors are arranged in parallel with the sub-scanning direction.

11. An apparatus according to claim 7, wherein said image-forming optical system comprises a size-reducing optical system.

12. An apparatus according to claim 7, wherein said blazed diffraction grating comprises a one-dimensional blazed diffraction grating.

13. A color image reading apparatus comprising:
a plurality of line sensors comprising plural one-dimensional sensor arrays disposed therein:
an image forming optical system for forming an image of a subject on said plurality of line sensors; and
a blazed diffraction grating, disposed in a light path between said image forming optical system and said plurality of line sensors, for color-separating a light beam from the subject into a plurality of color lights and for providing said separated light to corresponding ones of said plural one-dimensional sensor arrays, wherein 0-order diffracted light from said blazed diffraction grating has a blue light component.

14. An apparatus according to claim 13, wherein said plural one-dimensional line sensors comprise monolithic three-line sensors including one-dimensional sensors arrays arranged in three lines with a finite distance in the direction perpendicular to the array direction of said plural one-dimensional sensor arrays arranged on a common substrate.

15. An apparatus according to claim 14, wherein the subject is scanned in a sub-scanning direction orthogonal to the array direction of said plural one-dimensional sensor arrays.

16. An apparatus according to claim 15, wherein sensor surfaces of said monolithic three-line sensors are arranged in parallel with the sub-scanning direction.

17. An apparatus according to claim 13, wherein said image-forming optical system comprises a size-reducing optical system.

18. An apparatus according to claim 13, wherein said blazed diffraction grating comprises a one-dimensional blazed diffraction grating.

19. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights and for providing the separated light to corresponding ones of said plural one-dimensional sensor arrays; and
a slit provided in the light path between the subject and said image-forming optical system, and having an aperture the size of which in an array direction of said plural one-dimensional sensor arrays is longer than that in a direction perpendicular to the array direction of said plural one-dimensional sensor arrays, wherein the following condition is satisfied:

$$L1'/2 < L2,$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

20. An apparatus according to claim 19, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

21. An apparatus according to claim 20, wherein the subject is scanned in a sub-scanning direction orthogonal to the array direction of said plural one-dimensional sensor arrays.

22. An apparatus according to claim 21, wherein sensor surfaces of said monolithic three-line sensors are arranged in parallel with the sub-scanning direction.

23. An apparatus according to claim 19, wherein said image-forming optical system comprises a size-reducing optical system.

24. An apparatus according to claim 19, wherein said blazed diffraction grating comprises a one-dimensional blazed diffraction grating.

25. A color image reading apparatus, comprising:
a plurality of line sensors provided with plural one-dimensional sensor plurality of line arrays;
an image forming optical system for forming an image of a subject on said sensors;
a blazed diffraction grating disposed in a light path between said image forming optical system and said plurality of line sensors, for separating light from the subject into a plurality of color lights and for providing the separated light to the corresponding ones of said plural one-dimensional sensor arrays; and
a slit disposed in the light path between the subject and said image-forming optical system, and having an aperture the size of which in an array direction of said sensor arrays is longer than that in the direction perpendicular to the array direction of said plural sensor plural one-dimensional arrays, wherein following condition is satisfied:

$$L1'/2 < 0.95 \times L2$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

26. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights and for providing the separated light to corresponding ones of said plural one-dimensional sensor arrays; and,
a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein following condition is satisfied:

$$L1'/2 < 0.8 \times L2$$

wherein the direction perpendicular to the array direction of said plural one-dimensional sensor arrays is in a sub-scanning direction, L1 is defined as a length of penumbra edge $h_5$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

27. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights and for providing the separated light to corresponding ones of said plural one-dimensional sensor arrays; and
a slit disposed in the light path between the subject and said image-forming optical system, and having an aperture the size of which in an array direction of said plural one-dimensional sensor arrays is longer than that in a direction perpendicular to the array direction of said sensor arrays, wherein among the light from points of the subject deviating from an optical axis having been converged by said image forming optical system, said slit is arranged to prevent ±1-order and −1-order diffracted light of said blazed diffraction grating from being incident on said plural one-dimensional sensor arrays.

28. An apparatus according to claim 27, wherein said plural one-dimensional line sensors comprise monolithic three-line sensors including one-dimensional sensor arrays arranged in three lines with a finite distance in the direction perpendicular to the array direction of and said plural one-dimensional sensor arrays arranged on a common substrate.

29. An apparatus according to claim 28, wherein subject is scanned in a sub-scanning direction orthogonal to the array direction of said plural one-dimensional sensor arrays.

30. An apparatus according to claim 29, wherein sensor surfaces of said monolithic three-line sensors are arranged in parallel with the sub-scanning direction.

31. An apparatus according to claim 27, wherein said image-forming optical system comprises a size-reducing optical system.

32. An apparatus according to claim 27, wherein said blazed diffraction grating comprises a one-dimensional blazed diffraction grating.

33. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights and for providing the separated light to corresponding ones of said plural one-dimension sensor arrays; and
a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein among the light from points of the subject deviating from an optical axis having been converged by said image forming optical system, said slit is arranged to prevent a side-band component accompanying +1-order and −1-order diffracted light of said blazed diffraction grating from being incident on said plural one-dimensional sensor arrays.

34. An apparatus according to claim 33, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

35. An apparatus according to claim 34, wherein the subject is scanned in the sub-scanning direction orthogonal to the array direction of said plural one-dimensional sensor arrays.

36. An apparatus according to claim 35, wherein sensor surfaces of said monolithic three-line sensors are arranged in parallel with the sub-scanning direction.

37. An apparatus according to claim 33, wherein said image-forming optical system comprises a size-reducing optical size.

38. An apparatus according to claim 33, wherein said blazed diffraction grating comprises one-dimensional blazed diffraction grating.

39. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights and for providing the separated light to corresponding one of said plural one-dimensional sensor arrays; and
a slit inserted in the light path between said subject and said image-forming optical system, and having an aperture the size of which in an array direction of said plural one-dimensional sensor arrays is longer than that in a direction perpendicular to the array direction of said plural one-dimensional sensor arrays, wherein following conditions are satisfied:

$$Z_i(-1) > L1'/2 + Z_i(+1);$$

and $$Z_i(-1) - Z_i(+1) > L1'/2$$

wherein when the direction perpendicular to the array direction of said plural one-dimensional sensor arrays is in a sub-scanning direction, L1 is defined a length of penumbra edge $h_s$ in the sub-scanning direction determined by a pupil diameter of said image forming optical system and the aperture of said slit in the sub-scanning direction, L1' is defined a length of an image of penumbra edge $h_s$ having the length L1, projected on said plural one-dimensional sensor arrays by said image forming optical system, $Z_i(-1)$ is defined as a distance in the sub-scanning direction between one of said plurality of line sensors for receiving 0-order diffracted light and another of said plurality of line sensors for receiving −1-order diffracted light, and $Z_i(+1)$ is defined a distance in the sub-scanning direction between one of said plurality of line sensors for receiving 0-order diffracted light and another of said plurality of line sensors for receiving +1-order diffracted light.

40. An apparatus according to claim 39, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

41. An apparatus according to claim 40, wherein the subject is scanned in a sub-scanning direction orthogonal to the array direction of said plural one-dimensional sensor arrays.

42. An apparatus according to claim 41, wherein sensor surfaces of said monolithic three-line sensors are arranged in parallel with the sub-scanning direction.

43. An apparatus according to claim 39, wherein said image-forming optical system comprise a size-reducing optical system.

44. An apparatus according to claim 39, wherein said blazed diffraction grating comprises a one-dimensional blazed diffraction grating.

45. A color image reading apparatus, comprising:
a plurality of line sensors provided with plural one-dimensional sensor arrays;
an image forming optical system for forming an image of a subject on said plurality of line sensors:
a blazed diffraction grating disposed in a light path between said image forming optical system and said plurality of line sensors, for separating light from the subject into a plurality of color lights; and
a slit provided in the light path between the subject and said image-forming optical system, and having an aperture the size of which in an array direction of said plural one-dimensional sensor arrays is longer than that in a direction perpendicular to the array direction of said plural one-dimensional sensor arrays, wherein from among the light from points of the subject deviating from an optical axis having been converged by said image forming optical system, said slit is arranged to prevent a 0-order component of the light through said blazed diffraction grating from being incident on said plurality of line sensors receiving −1-order and +1-order diffracted light from said blazed diffraction grating.

46. An apparatus according to claim 45, wherein said plural one dimensional line sensors comprise monolithic three-line sensors including one-dimensional sensor arrays arranged in three lines with a finite distance in the direction perpendicular to the array direction of said plural one-dimensional sensor arrays arranged on a common substrate.

47. An apparatus according to claim 46, wherein the subject is scanned in a sub-scanning direction orthogonal to the array direction of said plural one-dimensional sensor arrays.

48. An apparatus according to claim 47, wherein sensor surfaces of said monolithic three-line sensors are arranged in parallel with the sub-scanning direction.

49. An apparatus according to claim 45, wherein said image-forming optical system comprises a size-reducing optical system.

50. An apparatus according to claim 45, wherein said blazed diffraction grating comprises a one-dimensional blazed diffraction grating.

51. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit disposed in the light path between the subject and said image-forming optical system, and having an aperture the size of which is an array direction of said plural one-dimensional sensor arrays is longer than that in a direction perpendicular to the array direction of said plural one-dimensional sensor arrays, wherein said slit is movable in the direction perpendicular to the array direction of said plural one-dimensional sensor arrays.

52. An apparatus according to claim 51, wherein said plural one-dimensional line sensors comprise monolithic three-line sensors including one-dimensional sensor arrays arranged in three layers with a finite distance in the direction perpendicular to the array direction of said plural one-dimensional sensor arrays arranged on a common substrate.

53. An apparatus according to claim 52, wherein the subject is scanned in a sub-scanning direction orthogonal to the array direction of said plural one-dimensional sensor arrays.

54. An apparatus according to claim 53, wherein sensor surfaces of said monolithic three-line sensors are arranged parallel to the sub-scanning direction.

55. An apparatus according to claim 51, wherein said image-forming optical system comprises a size-reducing optical system.

56. An apparatus according to claim 51, wherein said blazed diffraction grating comprises a one-dimensional blazed diffraction grating.

57. A color image reading apparatus comprising:
a plurality of line sensors comprising plural one-dimensional sensor arrays disposed therein;
an image forming optical system for forming an image of a subject on said plurality of line sensors; and
a blazed diffraction grating, disposed in a light path between said image forming optical system and said plurality of line sensors, for color-separating a light beam from the subject into a plurality of color lights, wherein 0-order diffracted light from said blazed diffraction grating has a blue light component.

58. An apparatus according to claim 57, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

59. An apparatus according to claim 58, wherein the subject is scanned in a sub-scanning direction orthogonal to the array direction of said plural one-dimensional sensor arrays.

60. An apparatus according to claim 59, wherein sensor surfaces of said monolithic three-line sensors are arranged parallel to the sub-scanning direction.

61. An apparatus according to claim 57, wherein said image-forming optical system comprises a size-reducing optical system.

62. An apparatus according to claim 57, wherein said blazed diffraction grating comprises a one-dimensional blazed diffraction grating.

63. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit provided in the light path between the subject and said image-forming optical system, and having an aperture the size of which in an array direction of said plural one-dimensional sensor arrays is longer than that in a direction perpendicular to the array direction of said plural one-dimensional sensor arrays, wherein the following condition is satisfied:

$$L1'/2 < L2,$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

64. An apparatus according to claim 63, wherein said plural one-dimensional line sensors comprise monolithic three-line sensors including one-dimensional sensor arrays arranged in three lines with a finite distance in the direction perpendicular to the array direction of said plural one-dimensional sensor arrays arrange on a common substrate.

65. An apparatus according to claim 64, wherein the subject is scanned in a sub-scanning direction orthogonal to the array direction of said plural one-dimensional sensor arrays.

66. An apparatus according to claim 65, wherein sensor surfaces of said monolithic three-line sensors are arranged in parallel with the sub-scanning direction.

67. An apparatus according to claim 63, wherein said image-forming optical system comprises a size-reducing optical system.

68. An apparatus according to claim 63, wherein said blazed diffraction grating comprises a one-dimensional blazed diffraction grating.

69. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit provided in the light path between the subject and said image-forming optical system, and having an aperture the size of which in an array direction of said plural one-dimensional sensor arrays is longer than that in a direction perpendicular to the array direction of said plural one-dimensional sensor arrays, wherein the following condition is satisfied:

$$L1'/2 < 0.95 \times L2$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

70. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit provided in the light path between the subject and said image-forming optical system, and having an aperture the size of which in an array direction of said plural one-dimensional sensor arrays is longer than that in a direction perpendicular to the array direction of said plural one-dimensional sensor arrays, wherein the following condition is satisfied:

$$L1'/2 < 0.8 \times L2$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, and L2 is defined as a shortest distance among distances between two adjacent ones of said plural one-dimensional sensor arrays in the sub-scanning direction.

71. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit disposed in the light path between the subject and said image-forming optical system, and having an aperture the size of which in an array direction of said plural one-dimensional sensor arrays is longer than that in a direction perpendicular to the array direction of said sensor arrays, wherein among the light from points of the subject deviating from an optical axis having been converged by said image forming optical system, said slit is arranged to prevent +1-order and −1-order diffracted light of said blazed diffraction grating from being incident on said plural one-dimensional sensor arrays.

72. An apparatus according to claim 71, wherein said plural one-dimensional line sensors comprise monolithic three-line sensors including one-dimensional sensor arrays arranged in three lines with a finite distance in the direction perpendicular to the array direction of and said plural one-dimensional sensor arrays arranged on a common substrate.

73. An apparatus according to claim 72, wherein subject is scanned in a sub-scanning direction orthogonal to the array direction of said plural one-dimensional sensor arrays.

74. An apparatus according to claim 73, wherein sensor surfaces of said monolithic three-line sensors are arranged in parallel with the sub-scanning direction.

75. An apparatus according to claim 71, wherein said image-forming optical system comprises a size-reducing optical system.

76. An apparatus according to claim 71, wherein said blazed diffraction grating comprises a one-dimensional blazed diffraction grating.

77. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein among the light from points of the subject deviating from an optical axis having been converged by said image forming optical system, said slit is arranged to prevent a side-band component accompanying +1-order and −1-order diffracted light of said blazed diffraction grating from being incident on said plural one-dimensional sensor arrays.

78. An apparatus according to claim 77, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

79. An apparatus according to claim 78, wherein the subject is scanned in the sub-scanning direction orthogonal to the array direction of said plural one-dimensional sensor array.

80. An apparatus according to claim 79, wherein sensor surfaces of said monolithic three-line sensors are arranged in parallel with the sub-scanning direction.

81. An apparatus according to claim 77, wherein said image-forming optical system comprises a size reducing optical system.

82. An apparatus according to claim 77, wherein said blazed diffraction grating comprise one-dimensional blazed diffraction grating.

83. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein the following conditions are satisfied:

$$Z_1(-1) > L1'/2 + Z_i(+1);$$

and $$Z_i(-1) - Z_i(+1) > L1'/2$$

wherein the direction perpendicular to the array direction of said plural one-dimensional sensor arrays is in a sub-scanning direction, L1 is defined as a length of penumbra edge $h_s$ in the sub-scanning direction determined by a pupil diameter of said image forming optical system and the aperture of said slit in the sub-scanning direction, L1' is defined as a length of an image of the penumbra edge $h_s$ having the length L1, projected on said plural one-dimensional sensor arrays by said image forming optical system, $Z_i(-1)$ is defined as a distance in the sub-scanning direction between one of said plurality of line sensors for receiving 0-order diffracted light and another of said plurality of line sensors for receiving −1-order diffracted light, and $Z_1(+1)$ is defined as a distance in the sub-scanning direction between one of said plurality of line sensors for receiving 0-order diffracted light and another of said plurality of line sensors for receiving +1-order diffracted light.

84. An apparatus according to claim 83, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

85. An apparatus according to claim 84, wherein the subject is scanned in a sub-scanning direction orthogonal to the array direction of said plural one-dimensional sensor arrays.

86. An apparatus according to claim 85, wherein sensor surfaces of said monolithic three-line sensors are arranged in parallel to the sub-scanning direction.

87. An apparatus according to claim 83, wherein said image-forming optical system comprises a size-reducing optical system.

88. An apparatus according to claim 83, wherein said blazed diffraction grating comprises a one-dimensional blazed diffraction grating.

89. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit disposed in the light path between the subject and said image-forming optical system, and having an aperture the size of which is an array direction of said plural one-dimensional sensor arrays is longer than that in a direction perpendicular to the array direction of said plural one-dimensional sensor arrays, wherein said slit is arranged to prevent a 0-order component of the light which comes from points of the subject deviating from an optical axis having been converged by said image forming optical system, and passes through said blazed diffraction grating from being incident on said plurality of line sensors receiving −1-order and +1-order diffracted light from said blazed diffraction grating.

90. An apparatus according to claim 89, wherein said plural one-dimensional line sensors comprise monolithic thee-line sensors including one-dimensional sensor arrays arranged in three lines with a finite distance in the direction perpendicular to the array direction of said plural one-dimensional sensor arrays arranged on a common substrate.

91. An apparatus according to claim 90, wherein the subject is scanned in a sub-scanning direction orthogonal to the array direction of said plural one-dimensional sensor arrays.

92. An apparatus according to claim 91, wherein sensor surfaces of said monolithic three-line sensors are arranged in parallel to the sub-scanning direction.

93. An apparatus according to claim 89, wherein said image-forming optical system comprises a size-reducing optical system.

94. An apparatus according to claim 89, wherein said blazed diffraction grating comprises a one-dimensional blazed diffraction grating.

95. A color image reading apparatus, comprising:
a plurality of line sensors provided with plural one-dimensional sensor arrays;
an image forming optical system for forming an image of a subject on said plurality of line sensors;
a blazed diffraction grating disposed in a light path between said image forming optical system and said plurality of line sensors, for separating light from the subject into a plurality of color lights; and
a slit disposed in the light path between the subject and said image-forming optical system, and having an aperture the size of which in an array direction of said plural one-dimensional sensor arrays is longer than that in a direction perpendicular to the array direction of said plural one-dimensional sensor arrays, wherein said slit is arranged to prevent a side-band component accompanying +1-order and −1-order diffracted light which comes from points of the subject deviating from an optical axis having been converged by said image forming optical system from being incident on said plural one-dimensional sensor arrays.

96. An apparatus according to claim 95, wherein said plural one-dimensional line sensors comprise monolithic three-line sensors including one-dimensional sensor arrays arranged in three lines with a finite distance in the direction perpendicular to the array direction of said plural one-dimensional sensor arrays arranged on a common substrate.

97. An apparatus according to claim 96, wherein the subject is scanned in the sub-scanning direction orthogonal to the array direction of said plural one-dimension sensor arrays.

98. An apparatus according to claim 97, wherein sensor surfaces of said monolithic three-line sensors are arranged in parallel with the sub-scanning direction.

99. An apparatus according to claim 95, wherein said image forming optical system comprises a size-reducing optical system.

100. An apparatus according to claim 95, wherein said blazed diffraction grating comprises one-dimensional blazed diffraction grating.

* * * * *

UNITED STATES PATENT AND TRADEMARK OFFICE
CERTIFICATE OF CORRECTION

PATENT NO. : 5,173,599

DATED : December 22, 1992

INVENTOR(S) : MICHITAKA SETANI

It is certified that error appears in the above-identified patent and that said Letters Patent is hereby corrected as shown below:

COVER PAGE
    At [56], "62-34106 10/1987 Japan" should read --62-234106 10/1987 Japan--.

COLUMN 1
    Line 15, "When" should read --when--.
    Line 17, "consisting" should read --consisting of--.
    Line 61, "are" should read --is--.

COLUMN 2
    Line 5, "distance," should read --distance--.
    Line 6, "$2.\sqrt{2}f.$" should read --$2.\sqrt{2}t.$--.
    Line 50, "sensor's" should read --sensors--.

COLUMN 3
    Line 23, "diagram" should read --diagrams--.

COLUMN 4
    Line 13, "On" should read --on--.
    Line 14, "Sequentially" should read --sequentially--.
    Line 22, "one dimensional" should read --one-dimensional--.
    Line 50, "one dimensional" should read --one-dimensional--.

COLUMN 5
    Line 13, "as should read --is--.
    Line 20, "Cross-section" should read --cross-section--.

UNITED STATES PATENT AND TRADEMARK OFFICE
CERTIFICATE OF CORRECTION

PATENT NO. : 5,173,599

DATED : December 22, 1992

INVENTOR(S) : MICHITAKA SETANI

It is certified that error appears in the above-identified patent and that said Letters Patent is hereby corrected as shown below:

<u>COLUMN 6</u>
    Line 21, "$L1'/2>0.95xL2$" should read --$L1'/2<0.95xL2$--.
    Line 23, "condition" should read --conditions--.
    Line 38, "(distances" should read --(distance--.
    Line 55, "When" should read --when--.

<u>COLUMN 7</u>
    Line 29, "one dimen-" should read --one-dimen---.

<u>COLUMN 8</u>
    Line 26, "prevented" should read --prevented.--.

<u>COLUMN 9</u>
    Line 60, "a" should read --an--.
    Line 62, "beam from" should read --beams from a--.

<u>COLUMN 10</u>
    Line 18, "system;" should read --system,--.
    Line 30, "$\pm1$-order" should read --+1-order--.

<u>COLUMN 11</u>
    Line 27, "therein:" should read --therein;--.

<u>COLUMN 13</u>
    Line 27, "and," should read --and--.
    Line 41, "edge $h_5$" should read --edge $h_1$--.

<u>COLUMN 14</u>
    Line 5, "$\pm1$-order" should read --+1-order--.
    Line 41, "one-dimension" should read --one-dimensional--.

UNITED STATES PATENT AND TRADEMARK OFFICE
CERTIFICATE OF CORRECTION

PATENT NO. : 5,173,599
DATED : December 22, 1992
INVENTOR(S) : MICHITAKA SETANI

It is certified that error appears in the above-identified patent and that said Letters Patent is hereby corrected as shown below:

COLUMN 16
    Line 5, "comprise" should read --comprises--.
    Line 14, "sensors:" should read --sensors;--.

COLUMN 20
    Line 50, "array." should read --arrays.--.
    Line 58, "comprise" should read --comprises--.

COLUMN 21
    Line 10, "$Z_1(-1)>L1'/2+Z_i(+1);$" should read --$Z_i(-1)>L1'/2+Z_i(+1);$--.
    Line 29, "$Z_1(+1)$" should read --$Z_i(+1)$--.

COLUMN 22
    Line 57, "one-dimension" should read --one-dimensional--.

Signed and Sealed this

Twenty-second Day of March, 1994

Attest:

BRUCE LEHMAN

*Attesting Officer*      *Commissioner of Patents and Trademarks*